Patented Apr. 20, 1948

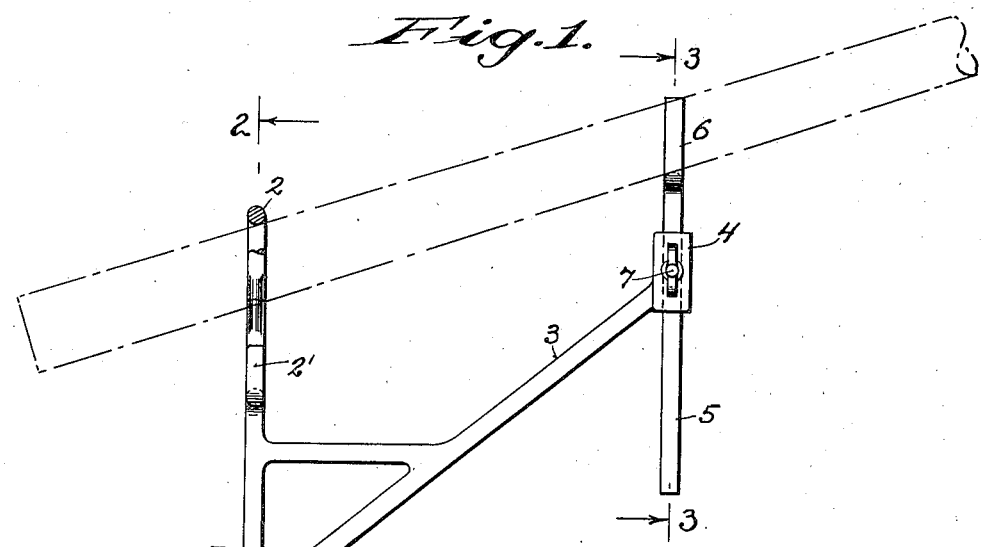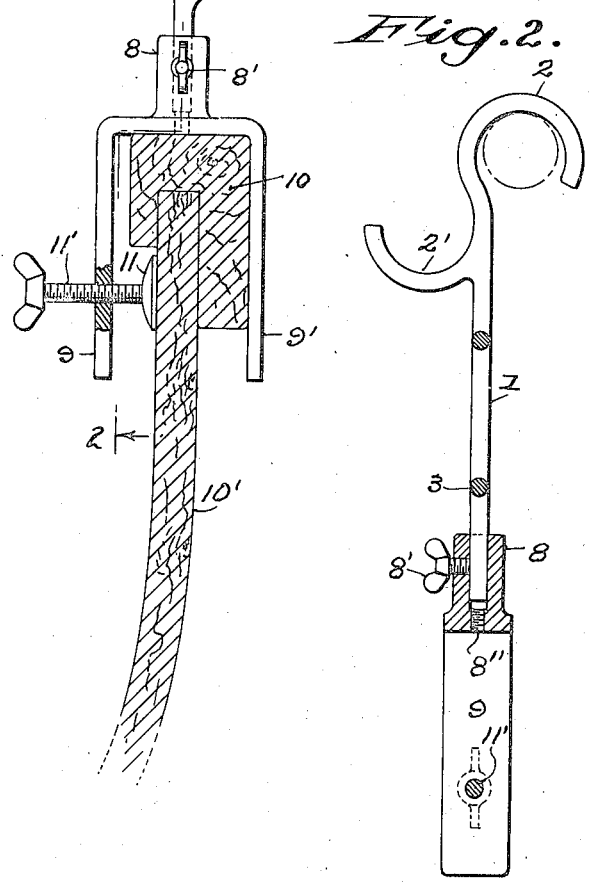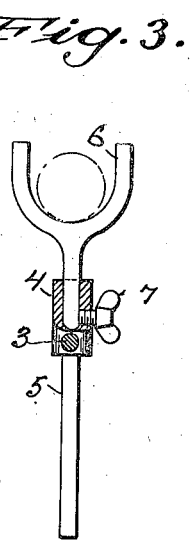

2,439,847

UNITED STATES PATENT OFFICE 2,439,847

POLE HOLDER

Mose E. Disotell, Berlin, Wis.

Application July 25, 1945, Serial No. 607,007

1 Claim. (Cl. 248—42)

My invention refers to a holder for poles, rods or other staffs and it has for its primary object to provide a bracket having loops in S form associated with a spaced crotch, whereby fish poles of the common variety may be supported therein at any desired angle, or it may be utilized as a fish pole holder, wherein the usual casting rod is weighted at its butt end by a reel. The bracket may be detachably anchored to a wharf rail or gunwale of a boat and, in some instances, it may be anchored, by a supplemental spear section, into the ground.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Figure 1 represents a side elevation of a pole holder embodying the features of my invention, with parts in section to more clearly illustrate structural features.

Figure 2 is a detailed sectional face view of the bracket, the section being indicated by line 2—2 of Figure 1, and Figure 3 is a similar face view of an adjustable crotch support forming part of the bracket, the view being in section as indicated by line 3—3 of Figure 1.

Referring by characters to the drawing, I indicates a bracket stem, terminating at its upper end with companion inverted loops 2—2' in the form of an S, whereby one of the open loops is extended downwardly and the companion loop extended upwardly, as best indicated in Figure 2. The stem has an upwardly extended angular braced arm 3, terminating with a sleeve 4, for the support of an adjustable shank 5, which shank, at its upper end, terminates with a crotch 6. The crotch shank is held in its vertically adjustable position by a thumb screw 7, as indicated in Figures 1 and 3.

The lower end of the bracket stem I is fitted into a socket 8, having depending therefrom spaced forked tangs 9—9'. These tangs engage the rail or gunwale 10 of a boat shell 10' and are firmly clamped to the rail by the mushroom portion 11 of a thumb bolt 11', which is in threaded union with the forked tang 9.

As noted in Figure 1 of the drawings, when the bracket is assembled, with reference to the head carrying the tangs, I provide a thumb screw 8', which thumb screw, as indicated in Figure 2, is in threaded union with a socket and engages the end of the stem.

The lower centrally bored end of the socket is provided with a threaded section 8", for the reception of a spear (not shown), which spear extends below the tangs and may serve as an anchor for the bracket by inserting said spear into the ground.

While I have shown the screws for holding the several parts together of the ordinary thumb type, I may, under certain circumstances, utilize the usual "Allen" type of screw, wherein a detachable wrench is employed, having a socket connection with a screw.

From the foregoing description, as indicated in dotted lines in Figure 1, when an ordinary fish pole is used, it will be seated in the crotch 6 and its butt end will be confined under the loop 2, whereby said pole may readily be disengaged from the bracket when it is desired to manipulate the same in fishing.

When a casting rod is used, having its butt end weighted by reel, etc., the weight of said butt will be sufficient to hold the rod in its normal dotted position, except that the butt of the rod will rest in the upwardly open loop 2'. Thus said rod may readily and quickly be disengaged for manipulation in fishing.

It is obvious that flag poles or similar staffs may be supported by this bracket holder.

While I have shown the holder practically in a one-piece assemblage, obviously I may, without departing from the spirit of my invention, construct the holder with a series of joints, whereby it can be knocked-down and placed conveniently in a fishing box.

I claim:

A rod or pole support comprising a vertically disposed stem terminating with a downwardly inclined loop, the same merging into an upwardly turned loop, forming an S in shape, the bottom upturned loop being adapted to receive the reel weighted butt of a casting pole, while the downturned loop is adapted to receive the light butt of a standard still fishing pole, a braced arm extending from the stem below the loops terminating with a vertically disposed sleeve, a shank adjustably fitted to the sleeve and an upwardly open crotch carried by the shank for supporting the intermediate portion of a reel weighted pole or a common still fishing pole.

MOSE E. DISOTELL.

REFERENCES CITED

The following references are of record in the file of this patent:

UNITED STATES PATENTS

| Number | Name | Date |
|---|---|---|
| 417,997 | Dupuis | Dec. 24, 1889 |
| 448,028 | Hall | Mar. 10, 1891 |
| 1,013,734 | Boyd | Jan. 2, 1912 |
| 1,992,165 | Bardon | Feb. 26, 1925 |
| 2,243,388 | Magyarosi | May 27, 1941 |